Figure 1:
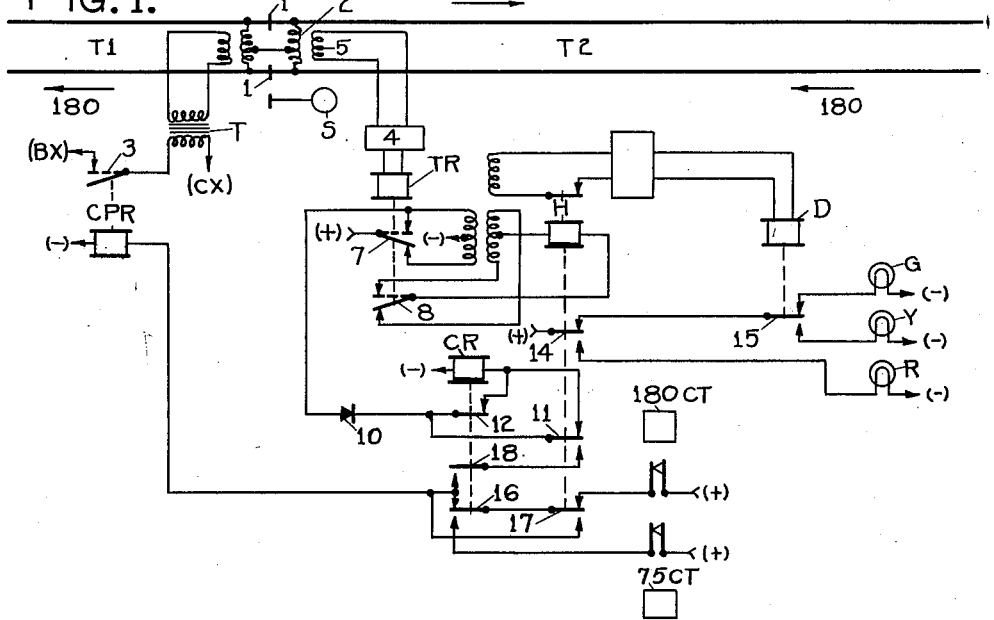

July 29, 1952      T. J. JUDGE      2,605,390
CODED TRACK CIRCUIT SIGNALING SYSTEMS Filed Oct. 13, 1948      2 SHEETS—SHEET 1

INVENTOR.
T. J. Judge,
BY Neil W. Preston,
HIS ATTORNEY

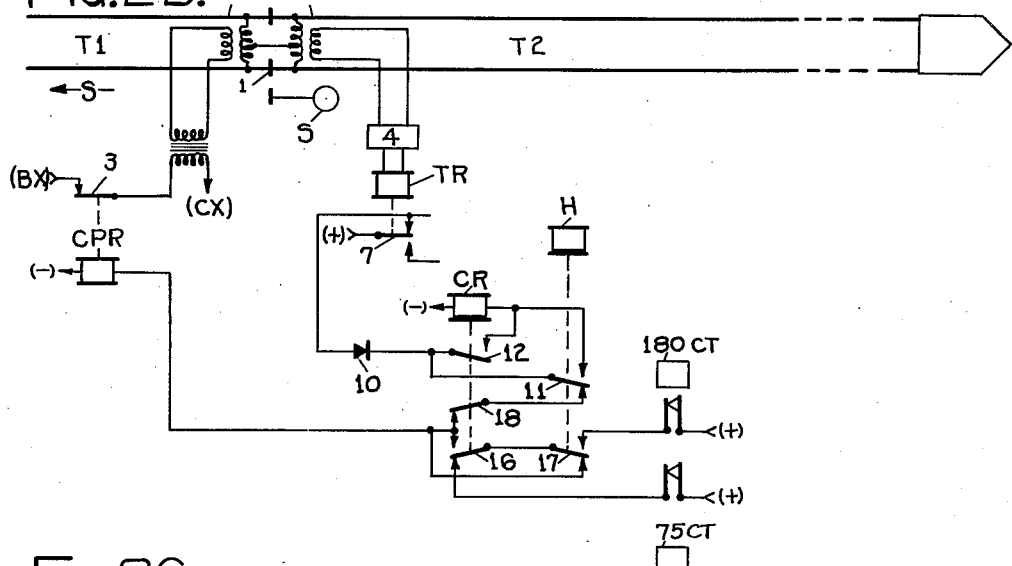
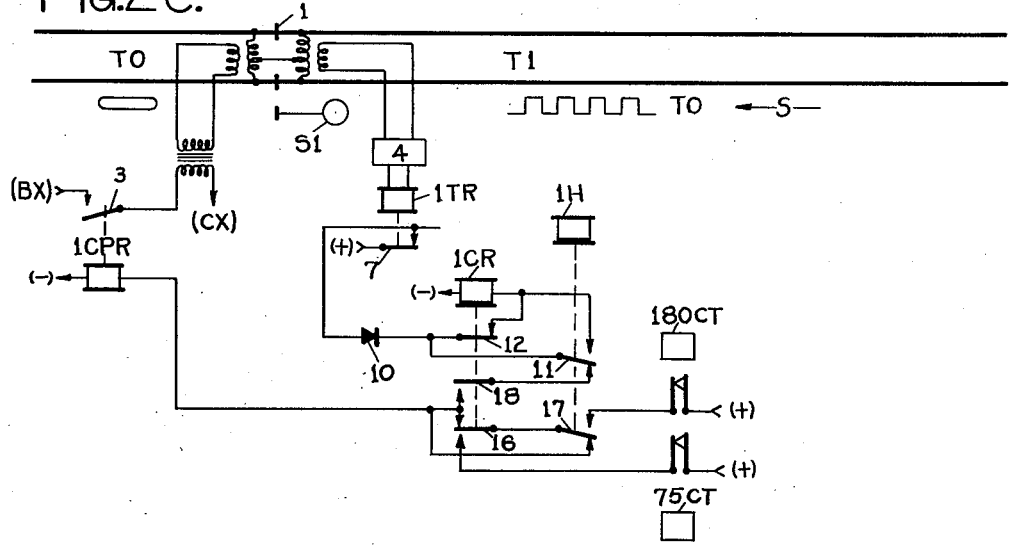
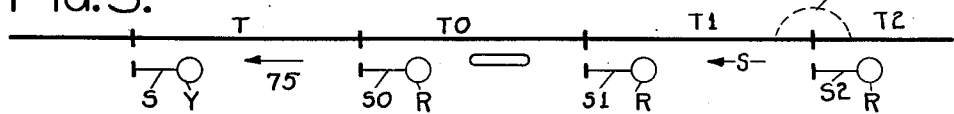

Patented July 29, 1952

2,605,390

UNITED STATES PATENT OFFICE 2,605,390

CODED TRACK CIRCUIT SIGNALING SYSTEMS

Thomas J. Judge, Rochester, N. Y., assignor to General Railway Signal Company, Rochester, N. Y.

Application October 13, 1948, Serial No. 54,275

6 Claims. (Cl. 246—34)

1

This invention relates to signalling systems for railroads employing coded track circuits, and more particularly to apparatus for checking the integrity of the insulated joints in the railroad track adjacent signal locations and preventing improper signal indications in the event of failure of such insulated joints.

In some types of coded track circuits for the control of automatic block signals and the like, a break-down or failure of the insulated joints in the track rails electrically separating adjoining track sections tends to permit energization of the code following track relay of one track section by the application of coded energy to the track rails of the adjoining track section, so that improper coding operation of such track relay may occur and cause an improper signal indication or the like. In certain types of systems, this contingency of improper operation in coded track circuits in the event of defective insulated joints may be avoided by employing a code following track relay at one side of the insulated joints which requires current of a certain polarity or other distinctive character for its operation, and by applying current of a different polarity or character to the track rails of the adjoining track section on the other side of said insulating joints, so that a false or improper coding operation of the track relay cannot be reproduced by energy fed from the adjoining track section through the defective insulated joints. This expedient cannot be employed where alternating current of the same frequency, or code pulses of different polarities at different times, are employed for operation of the code following track relays.

It is proposed in accordance with the present invention to provide apparatus for use with coded track circuits energized by alternating current or code pulses of different polarities, which will automatically check the integrity of the insulated joints separating adjoining track sections at a signal location or the like, and which automatically prevents a false or improper coding operation if the insulated joints are defective.

Generally speaking, by way of explanation and without attempting to define the nature and scope of this invention, circuit means is provided for the track section associated with a signal location or the like so that, when this track section becomes unoccupied and its track

2 relay may be operated, improper energization of this track relay by energy fed from an adjacent track section through defective insulated joints automatically results in a steady energization of this adjoining track section and said track relay, rather than an improper coding operation of the relay; and auxiliary relay means is provided so that the steady energization of the adjoining track section under such conditions following a previous coding operation does not cause a similar steady energization of a track section in the rear of it.

Various other characteristic features, attributes, and advantages of this invention, both in its broad and specific aspects, will be in part apparent and in part pointed out as the description progresses.

The accompanying drawings illustrate in a simplified and diagrammatic manner one form of the invention as applied to a typical automatic block signalling system using alternating current coded track circuits, the parts and circuits being illustrated more with a view of facilitating an explanation and understanding of the nature of the invention, than for the purpose of showing the specific details of construction and arrangement of parts and circuits preferably employed in practice.

Figure 2A:
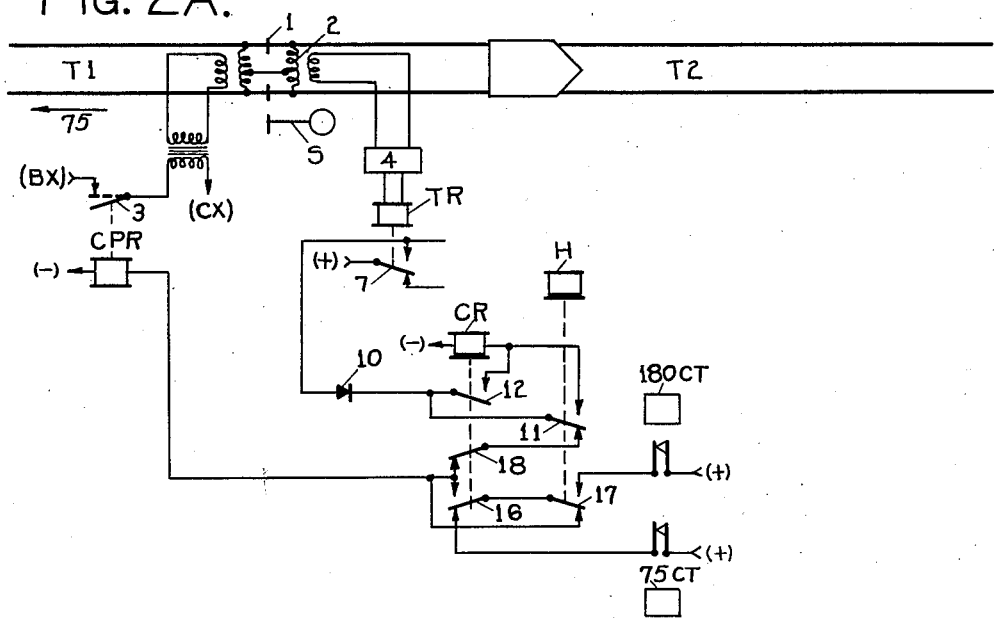

In these drawings, Fig. 1 illustrates in the normal operating condition the apparatus and circuits which are associated with a typical signal location of an automatic block signalling system of the type contemplated;

Figs. 2A to 2C illustrate this apparatus in its different operated conditions; and Fig. 3 is a diagrammatic representation of the conditions of the track sections for a number of signal locations when defective insulated joints at one of these signal locations has been automatically detected and manifested in accordance with this invention.

The typical embodiment of the invention illustrated relates to an automatic block signalling system for multiple track railroads using coded track circuits energized by alternating current. In such a system, the railroad track is divided into blocks by insulated joints in the track rails in the usual way, and a signal at the entrance end to each block has its favorable or proceed indications controlled in accordance with the rate of coding of the track section or track sections of the associated block, all in a manner familiar with those skilled in the art. In such a system, the apparatus and circuits for each signal location may be assumed to be the same; and Fig. 1 illustrates the apparatus and circuits of this invention for a typical signal location. The invention, however, is not limited to automatic block signal systems, or coded track circuits operated by alternating current, and may be readily adapted to coded track circuits for other applications and uses; but an explanation and understanding of such a typical embodiment of the invention will serve to make clear the characteristic features, functions, and mode of operation characterizing the invention. In this connection, it was convenient to assume that each block comprises a single coded track circuit, but various variations in the way of cut sections, special sections for the control of highway crossing signals, and the like may be employed.

Referring to Fig. 1, the invention is employed for detecting the integrity of insulated joints 1 which are adjacent a signal S and separate a rear track section T1 and a forward circuit track section T2. Each of these track sections T1, T2 represents a block in a block signalling system, and each track section is equipped with conventional apparatus and circuits to constitute a typical alternating current coded track circuit. Such alternating current coded track circuits are particularly useful for railroads using electrical propulsion; and the impedance bonds for such an application are shown diagrammatically at 2 in Fig. 1. The signal S, which may be of any suitable type, in the interests of simplicity, is assumed to be a color light signal having lamps with lighting circuits controlled by relays H and D to display the usual green, yellow and red aspects for clear, caution and stop indications.

The coded track circuit equipment is the same for each block or track section in the type of system assumed, and comprises in general code transmitting means shown in Fig. 1 for the exit end of the track section T1, and code receiving means shown for the entrance end of the track section T2 in Fig. 1. The code transmitting means comprises a transmitting relay CPR and associated circuits more conveniently discussed later, which operates a contact 3 in the primary circuit of a transformer T, which is connected to the terminals of a suitable source of alternating current indicated by BX and CX. The secondary of the transformer T is coupled to the impedance bond 2 in the usual manner, so that when relay CPR is energized, an alternating current is applied across the track rails at the exit end of the track section T1.

The code receiving apparatus comprises a code following track relay TR, which is connected through a suitable full wave rectifying unit 4 to a winding 5 coupled to the impedance bond 2 for the track section T2. This code following track relay TR may be of the biased polar type for sensitivity and quick response, but is essentially a quick acting relay energized by rectified alternating current supplied from the track section T2. The track relay TR operates contacts 7 and 8 which control decoding means of the usual type to cause energization from the relay H when this track relay is intermittently energized at any code rate, and a relay D when this track relay is intermittently energized at a predetermined code rate for a clear indication, such as 180 times per minute. The decoding apparatus shown, which may take various forms, is disclosed in various prior patents, such as F. X. Rees, No. 2,353,930, dated July 18, 1944, or T. J. Judge, No. 2,350,620, dated June 6, 1944, so that an explanation of the detailed structure and operation of the decoding apparatus is unnecessary.

The coded track circuit equipment for the signal location also includes a suitable code oscillator or motor driven transmitter for operating contacts 75CT and 180CT for the 75 and 180 code rates. This is conventional equipment and need not be further discussed.

A coded track circuit equipment at each signal location also includes in accordance with this invention an auxiliary stick relay CR of the conventional neutral type with ordinary operating characteristics.

The various circuit connections are illustrated in a simplified manner, with the symbols (+) and (—) associated with arrows to indicate terminals with suitable source of direct current.

*Operation.*—Fig. 1 illustrates the apparatus and circuits associated with the signal location in the normal operating condition when no trains are present, and the track sections T1 and T2 are supplied with alternating current code pulses at the 180 code rate. Under such conditions, relays H and D are both energized by the intermittent operation of the track relay TR and its contacts 7 and 8 at this 180 rate. The relay CR is energized by a circuit which may be traced from (+), through front contact 7 of code following track relay TR, through a rectifier 10, and either front contact 11 of relay H or front contact 12 of relay CR. In other words, both the pick-up and stick circuits for the relay CR are established under these normal operating conditions. The transmitter relay CPR is connected to the coding contacts 180CT operating at the 180 code rate by a circuit which may be traced from (+), through coding contacts 180CT, front contact 17 of relay H, front contact 16 of relay CR, and relay CPR, to (—). Contacts 14 and 15 of relays H and D establish a lighting circuit for the green lamp G.

While the insulated joints of the usual type in construction may lose their insulating qualities, and become defective or break down at any time, and independently of train movement, a broken down joint condition is usually created as a result of a train movement over the joints; and since it is the presence of a train which renders improper coding operation due to defective joints unsafe, it is expedient to discuss the operation of this invention under the condtions where a train has passed the signal S and has rendered the insulated joints 1 defective in so doing.

When a train passes the signal S and occupies the track section T2, the relays and circuits assume the condition illustrated in Fig. 2A. The track relay TR is shunted by the train and remains in its deenergized position, opening at its front contact 7 both the pick-up and stick circuits for the relay CR. The relay H is also deenergized. Under these conditions, the transmitter relay CPR is connected to the coding contact 75CT operating at the 75 code rate by a circuit which may be traced from (+), through contact 75CT, back contact 16 of relay CR, back contact 17 of relay H, and winding of relay CPR, to (—). Thus, the track section T1 is coded at the 75 code rate to provide a caution indication for the signal (not shown) next in the rear of signal S.

In order to indicate the utility and significance of the present invention, it is convenient to consider first the operation of the system that might occur under broken-down joint conditions if the protective features characteristic of this invention were not employed. Assume that the joints J at the signal S are defective, so that a voltage applied across the track rails of the rear track section T1 may feed around these joints over a circuit path indicated by the dotted line $x$ in Fig. 2B, and energize track relay TR in the absence of a wheel shunt. Assuming that the train in track section T2 advances to some point where its wheel shunt is no longer effective to prevent energization of the track relay TR by energy fed from the rear track section T2. One simple case is where the train in question has advanced beyond the next signal location and vacated the track section T2. Under such conditions, and without the protective features of this invention, the track relay TR may be operated by the code applied to the rear of the track section, due to the broken down condition of the insulated joints J, even though no legitimate code is provided for the track section T2. Such coding operation of the track relay TR energizes relay H which causes the code rate supplied to the rear track section T2 to be changed to the 180 code rate; and such 180 code rate is fed through the defective insulated joints and operates the track relay TR to cause signal S to indicate green or proceed, even though the train may be in the next block in advance and a yellow or caution indication should be displayed. The foregoing discussion assumes that the legitimate code for the track section T2 is not present, due to a broken rail or other defect; but even if a legitimate 75 code exists in track section T2, defective insulated joints would permit code at the 180 rate in track section T1 to be supplied to track section T2 and establish interfering or beat code conditions, which are likely to cause erratic and occasional false indications for the signal S in question.

Considering now the operation of the system under similar conditions with the protective features provided by this invention, and referring to Fig. 2B, when the train in track section T2 has advanced to the point where its wheel shunt is no longer effective to prevent energization of the track relay TR, the initial energization of this track relay TR, whether by a legitimate code pulse, or by a code pulse fed through the defective insulated joints along the circuit path $x$ from the rear track section T1, establishes a circuit to energize the transmission relay CPR which may be traced from (+), through front contact 7 of track relay TR, rectifier 10, back contact 11 of relay H, back contact 18 of relay CR, and relay CPR, to (—). It will be noted that this circuit just traced will maintain the relay CPR energized independently of the opening of the coding contacts 75CT. If, as assumed, the insulated joints are defective, the alternating voltage applied across the track rails of the rear track section T1 by the energized condition of transmitter relay CPR is effective to maintain the code following track relay TR of the forward track section energized. Consequently, in the case of the defective insulated joints, steady energy is supplied to the rear track section T1 and also to the track relay TR of the forward track section T2. Under such conditions, regardless of whether or not there is a legitimate code in track section T2, the track relay TR remains energized, and likewise the relays H and D remain deenergized to provide a stop indication.

The circuit means acting to check the integrity of the insulated joints at location of signal S upon initial energization of the track relay TR after the forward track section T2 becomes unoccupied, and for automatically creating a steady energized or locked up condition of the system, as just described, includes the back contact 18 of the relay CR; and this relay serves to render this circuit means ineffective for a track section in a coding condition at the time steady energy is applied, so that the steady energization of the rear track section T1 in the manner just explained will not in turn cause a steady energization of the track section next in the rear of it, and so on. Considering how the relay CR performs this function, and referring to Fig. 2C which illustrates the conditions of the typical apparatus at signal S1 of Fig. 3, assume that the track section T1 in this Fig. 2C is being coded at the time the steady energy is applied thereto, as indicated in Fig. 2A. Under these conditions, when the steady energy is applied to the track section T1, the relay 1H for this track section is energized due to the previous coding operation, and relay 1CR is energized. Consequently, when the steady energy is applied to the rear track section T1 on account of the defective insulating joints and the track relay 1TR of the rear track section T1 has been maintained steadily energized long enough to release its relay 1H, the relay 1CR is maintained energized by the stick circuit through its front contact 12, and the circuit causing steady energization of the rear track section T0, previously described for track section T1 and shown in Fig. 2B, is broken at the back contact 18 of relay 1CR. Thus, the condition of steady energization is not repeated or cascaded, as otherwise might occur. Under these conditions illustrated in Fig. 2C, the code transmitter 1CPR for the rear track section T0 remains deenergized, the circuit for the 75 code being opened at the back contact 16 of relay 1CR, and its circuit for the 180 code being opened at the front contact 17 of relay H.

Thus, as diagrammatically indicated in Fig. 3, when defective insulated joints at a given signal location are automatically detected by this invention, the track section next in the rear of this signal location is steadily energized, the second track section in the rear is deenergized, and the third track section is being coded at the 75 caution code rate.

In the preferred circuit arrangement illustrated in Fig. 1, the front contact 7 of the code following track relay, which controls the energization of the control circuits for the relay CR, is also used for energizing the upper winding of the decoding transformer; and the rectifier 10 is preferably included in the control circuits for relay CR, so that under the conditions illustrated in Fig. 2A, for example, this winding of the decoding transformer may not be intermittently energized by operation of the code transmitter contact 75CT, as might otherwise occur due to the circuit connections then set up except for this rectifier.

From the foregoing it can be seen how this invention provides automatic protection against a false clear signal indication or similar improper operation of a coded track circuit due to a break down of the insulated joints, that would otherwise permit the code following track relay of one track section to be improperly operated by code pulses applied to an adjacent track section. It will be noted that these protective features do not depend upon staggered polarity or the like, and permit alternating current of code pulses of different polarities under different conditions to be utilized for the operation of coded track circuits. It can also be seen that these protective features are obtained by the operation of the code following track relay itself, in combination with auxiliary stick relay CR, and the signal control relay H, without relying upon relative times for the energization and release of these relays, or other relays such as slow release front or back contact repeaters of the code following track relay.

The characteristic features and operating principles of this invention may be employed in different ways for different types of coded track circuit systems, other than the particular type of alternating current coded track circuit system illustrated; and I desire to have it understood that various adaptations, modifications and additions may be made in the specific embodiment of the invention shown and described, and in its field of use, without departing from the invention.

What I claim is:

1. In a coded track circuit signalling system for railroads, the combination of adjoining track sections separated by insulated joints, a code following track relay connected across the track rails at the entrance end of the forward track section, code transmitting means including a code transmitter relay for applying energy across the track rails at the exit end of the rear track section at different code rates dependent upon traffic conditions, said code transmitting means including circuit means for applying energy to said code transmitter relay through a front contact of said track relay upon the initial energization of the track relay for the forward track section and so long as that track relay is continuously thereafter maintained energized, and means responsive to the intermittent coding operation of said track relay and also a steady energization thereof following such intermittent coding operation for rendering said circuit means ineffective, whereby improper energization of said track relay by energy fed through defective insulated joints from the rear track section causes a steady energization of that track section and said relay, and whereby the steady energization of the rear track section under such conditions does not cause a similar steady energization of a track section in the rear of it similarly equipped.

2. In a coded track circuit system, a circuit and relay organization for manifesting failure of insulated joints separating adjoining track sections comprising in combination, a code responsive means for the entrance end of the forward track section including a code following track relay and a signal control relay energized only by the intermittent coding operation of said track relay, a stick relay having a pickup circuit dependent upon the closure of a front contact of said signal control relay code transmitting means for applying energy across the track rails at the exit end of the rear track section, and a circuit including a front contact of said track relay and a back contact of said signal control relay and a back contact of said stick relay for operating said code transmitting means, whereby the integrity of the insulating joints is checked when the forward track section becomes unoccupied by causing a steady energization of the rear track section and said track relay for the forward track section when energy may be fed from the rear track section to the forward track section through defective insulated joints.

3. In a coded track circuit system for railroad tracks divided into track sections by insulated joints and having code transmitting and code receiving means for each track section, said code receiving means including a code following track relay and a signal control relay energized only in response to the intermittent coding operation of said track relay, circuit means for controlling the code transmitting means for the rear track section upon the initial energization of the track relay for the forward track section when it becomes unoccupied to maintain a steady energization of the rear track section until said code following track relay for the forward track section is deenergized, and relay means initially operated by the energization of said track relay while said signal control relay is energized and maintained operated after the release of said signal control relay so long as said track relay is energized for rendering said circuit means ineffective for steadily energizing the next track section in the rear.

4. In a coded track circuit system for railroads, a relay and circuit organization for detecting failure of the insulated joints separating track sections at a signal location and acting to prevent clearing of said signal when said insulated joints are broken down, said organization comprising code transmitting means for applying energy to the track section in the rear of said signal, code responsive means for the track section in advance of said signal including a code following track relay and a signal control relay energized only by intermittent operation of said track relay, a circuit closed when said track relay is initially energized while said signal control relay is deenergized for operating said code transmitting means to apply steady energy to the rear track section, relay means acting while energized to prevent closure of said circuit, and control circuits for said relay means for initially energizing said relay means when said code following track relay and said signal control relay are contemporaneously energized and for maintaining it energized while said code following track relay is energized after said signal control relay has once been energized and is thereafter released.

5. In an organization for detecting the failure of the insulated joints of a coded track circuit for railroads, code transmitting means for applying energy to the track section in the rear of a signal location, code responsive means connected to the track in advance of such signal location including a code following relay and a signal control relay energized only by the intermittent operation of said code following relay, circuit means effective when said code following relay is energized and said signal control relay is deenergized to operate said code transmitting means to apply steady non-coded energy to the rear track section, relay means effective when in a particular position to prevent closure of said circuit means, and control circuit means causing said relay means to be in said particular condition when said code following relay is initially steadily energized when said signal control relay has been energized, said means causing said relay means to be in its opposite position when said code following relay is initially steadily energized with said signal control relay deenergized.

6. A circuit organization for detecting broken down insulating joints at each signal location in a coded track circuit signalling system comprising for each signal location, a code following track relay for the forward track section at that signal location, decoding means including a slow release signal control relay energized only by the intermittent operation of said code following relay, a normally energized stick relay having a pickup circuit closed through a front contact of said slow release relay and having its initial energization dependent upon the steady or intermittent energization of said code following relay, and track circuit code transmitting means effective to apply selectively steady or coded energy to the rear track section at the associated signal location, said steady energization being selected to be applied dependent upon said code following relay being energized and said signal control and said stick relays being in their deenergized positions.

THOMAS J. JUDGE.

REFERENCES CITED

The following references are of record in the file of this patent:

UNITED STATES PATENTS

| Number | Name | Date |
| --- | --- | --- |
| 2,235,134 | Allison | Mar. 18, 1941 |
| 2,277,461 | Shields | Mar. 24, 1942 |
| 2,369,053 | Jerome | Feb. 6, 1945 |